United States Patent [19]

Famulari

[11] Patent Number: 4,921,375
[45] Date of Patent: May 1, 1990

[54] ANTISCATTERING DEVICE FOR THE COLLECTION OF WASTE MATERIAL PRODUCED IN THE COURSE OF DRILLING, MILLING AND SIMILAR OPERATIONS, TO BE FITTED ON THE RELEVANT MACHINE TOOLS

[75] Inventor: Giovanni Famulari, Trieste, Italy
[73] Assignee: Tiziana Lenarduzzi, Trieste, Italy
[21] Appl. No.: 203,161
[22] Filed: Jun. 7, 1988

[30] Foreign Application Priority Data

Jun. 12, 1987 [IT] Italy ................. 82811 A/87

[51] Int. Cl.[5] ............................................. B23B 47/00
[52] U.S. Cl. ........................................ 408/67; 408/58;
173/75; 29/DIG. 83; 29/DIG. 53; 144/252 R;
175/209
[58] Field of Search ............................ 408/67, 710, 58;
29/DIG. 83, DIG. 53; 409/134; 144/252;
51/273; 173/104, 75; 175/207, 209, 217

[56] References Cited

U.S. PATENT DOCUMENTS

| | | | |
|---|---|---|---|
| 1,581,719 | 4/1926 | Carter | 409/137 |
| 2,152,352 | 3/1929 | Holt | 51/273 |
| 2,419,744 | 4/1947 | Thwaites | 29/DIG. 83 X |
| 2,452,268 | 10/1948 | Schumann | 173/163 |
| 2,634,952 | 4/1953 | Brinkley | 175/209 |
| 3,167,260 | 1/1965 | Gibbons et al. | 29/DIG. 82 X |
| 3,256,944 | 6/1966 | Holzapfel | 173/75 |
| 3,583,821 | 6/1971 | Shaub et al. | 144/252 X |
| 3,837,383 | 9/1974 | Ko | 408/67 X |
| 3,881,838 | 5/1975 | Derbyshire | 408/67 |
| 4,011,792 | 3/1977 | Davis | 408/241 R X |
| 4,098,351 | 7/1978 | Alessio | 173/104 X |
| 4,192,390 | 3/1980 | Wanner et al. | 173/75 |

FOREIGN PATENT DOCUMENTS

| | | | |
|---|---|---|---|
| 2233125 | 6/1973 | Fed. Rep. of Germany | 408/67 |
| 2322743 | 11/1974 | Fed. Rep. of Germany | 408/710 X |
| 2925908 | 1/1981 | Fed. Rep. of Germany | 408/67 |
| 2940362 | 4/1981 | Fed. Rep. of Germany | 408/67 |
| 3401564 | 7/1985 | Fed. Rep. of Germany | 51/273 |

Primary Examiner—Z. R. Bilinsky
Assistant Examiner—R. S. Schultz
Attorney, Agent, or Firm—Browdy and Neimark

[57] ABSTRACT

An antiscattering device for the collection of waste material (dust, shavings) produced in the course of drilling, milling and similar operations, to be fitted in the most appropriate way on machine tools and basically made up of a bellows shaped bell (e.g. frustum-conical), provided, if required, with an axially elastic vacuum cleaner or extractor—which can be fitted on the machine tools themselves. This bell is permanently or temporarily secured to the frames of machine tools (e.g. manually, on a drill), coaxially to the drill bit while its base, provided with a seal ring, rests on the surface of the material to be drilled, thereby creating, with its shell, a receptacle where the waste material collects.

4 Claims, 1 Drawing Sheet

ANTISCATTERING DEVICE FOR THE COLLECTION OF WASTE MATERIAL PRODUCED IN THE COURSE OF DRILLING, MILLING AND SIMILAR OPERATIONS, TO BE FITTED ON THE RELEVANT MACHINE TOOLS

BACKGROUND OF THE INVENTION

1. Field of the Invention

The present invention relates to an antiscattering device for the collection of waste material produced in the course of drilling, milling, etc. to be fitted on the relevant machine tools.

2. The Prior Art

It is well known that, when drilling any kind of material (stone, mortar, wood, iron, etc.), waste material is produced and then discharged and scattered all over the place. This means having to spend time cleaning the working site, after the drilling; often the cleaning will take more time than the drilling itself.

Considering the wide-spread use of drills, in all sorts of environments and situations, there are numerous occasions where they are required and the problem of waste materials particularly arises in furnished rooms and public places (apartments, shops, restaurants, etc.).

In these cases the scattering of waste material is a serious problem affecting people's health and well-being, and entailing the cleaning of the premises. Waste material is usually made up of fine or coarse dust, resulting from the drilling of materials (bricks, cement, stone, mortar, chalk, wood panels, particle board, plastic, etc.), which is easily scattered over a wide area, covering up the furniture and accessories and penetrating the most hidden places. The cleaning of the room is, therefore, time-consuming and difficult, and takes up more time than the drilling itself.

At present, no special devices are available to solve this problem, except measures based on everyday practice and experience, but nothing particularly useful and functional which can be used in any situation.

SUMMARY OF THE INVENTION

The abovementioned invention prevents waste material from being scattered around the drilling site and can be fruitfully used, in its various versions, in many sectors of both professional and sparetime activities. It is particularly useful when fitted on both portable and fixed drills or machine tools in general, with an advance motion parallel to the axis of rotation of the tool. The device is based on a bell to be fitted coaxially to the drill bit. In the course of drilling, the bell encloses the bit itself within its side walls and the surface of the material to be drilled, thereby preventing the waste material from being scattered all around.

More in detail, the bell has a frustum-conical bellows shape or similar (e.g. frustum of pyramid, cylindrical, prismatic or other); its material and shape lend the bell a certain amount of flexibility, in the axial direction, so that it behaves like a spring which can be compressed and then return to its original shape, once the cause of deformation has ceased.

The wider end of the bell is open and provided, all around its perimeter, with a ring of a suitable section, preferably made of soft and elastic material.

This ring will rest on the surface of the material to be drilled and, by pressing the bell against its, it perfectly adjusts to the profile, even if the surface is rough and uneven.

In this way, no space is left between the base of the bell and the surface; therefore, no waste material can escape the bell.

The other end of the bell can be connected to the drill body according to various systems, such as pressure clutches, bayonet and screw joints, etc.), seeing to it, however, that such joint is tight, to prevent the waste material from escaping.

The invention also provides for the continuous discharge of the waste material from the bell into an adequately large container, which, once filled, is to be replaced or emptied.

The waste material is extracted by means of an air flow which runs through the bell in the axial direction, taking away with it the waste material; the flow is then channelled outside the bell into a collector, which is structured and designed like a filter-bag for the aspiration of dust or shavings. The airflow is produced by one or more fans, which can be fitted on the outside of the bell and drill, or be an integral part of it.

This latter solution is particularly suitable for portable drills because of its compact and simple design.

In particular, an aspiration fan is keyed on a coaxial shaft and outside the driving shaft of the drill. It is mounted right behind the drill spindle, housed in a circular aspiration chamber contained in the drill frame.

The shaft where the fan is fitted, is put into motion by the drill driving shaft by means of a transmission system, for example, made up of gearings, or belts, clutch disks or other, which guarantee a certain degree of ratio between the angular velocities of the two shafts.

This ensures that the fan and the drill bit work at an ideal rotation rate for their performance.

In the circular aspiration chamber there is a discharge pipe through which, by means of an air flow, the waste material is discharged into the filter-bag, where the material is collected.

Once the bit is fitted on the spindle and the bell is mounted on the aspiration chamber, the drilling can be carried out without the waste material being scattered.

For a correct operation, once the bell has been fitted on the drill, it will have to be longer than the drill bit in the axial direction. To this end, some extensions, even cylindrical ones, can be applied between the bell and the drill when very long bits are used.

The drilling is in no way affected by the presence of the bell and can be carried out as usual. Once the bit has been placed on the drilling spot, the base of the bell, provided with a seal ring, is already pressed against the material to be drilled, as the bell is longer than the bit.

When drilling is started, the material collects inside the bell, without being scattered.

At the same time, the fan comes into action creating an axial air flow, which carries the material with it. The material is gradually discharged into the bell and is eventually deposited in the collecting filter-bag.

By carrying on with the drilling and making the drill go forward in the axial direction, the bell is further compressed against the surface, obviously increasing the base of the bell resting on the surface; in the meantime, the fan continues to suck and discharge the waste material.

Once the drilling is finished, the bit can be extracted from the hole more easily thanks to the compressed bell which, like a spring, tends to push the drill away from the surface.

Besides its important function as a collector of waste material, the bell also helps preventing accidents; by enclosing the drill bit inside it, should the drill bit accidentally break, the bell avoids the chips released by the bit or the waste material being flung around, harming the user or the people nearby.

The system described can have different shapes, materials, construction features, etc. in order to be adjusted to any kind of machine tool, though maintaining the purposes and functions of the invention described above.

The invention itself is liable to some changes which make its construction and use simpler, maintaining, however, its original function, i.e. the collection of waste material.

For example, the aspiration fan can be directly keyed onto the drill driving shaft, without interposing any gears for the transmission of the motion.

Furthermore, the system for the continuous extraction of waste material can be completely absent.

In this case, the waste material remains inside the bell and at the end of the drilling the bell can be emptied by discharging the waste material into a separate collector.

This rather austere solution is quite functional when only a few occasional holes have to be drilled; a typical example is provided by small, sparetime household jobs.

Against this background, there is a further variation of the invention which provides for the fitting of the bell directly on the drill bit, with no involvement of the drill frame.

More precisely, a cylindrical bush is threaded through the drill bit, at the level of the connection tang, and its outside diameter always remains the same, whatever bit it is fitted on.

Each diameter of the drill bits, therefore, will have to be equipped with the relevant bush with a suitable internal diameter. This bush can be fitted on the bit by the manufacturer himself.

Before the drilling operation is started, the bush is to be mounted on its seat, on the back end of the bell (the end opposite to the surface to be drilled); in this way, an isolated receptacle will be created and will act as a collector for the waste material produced in the course of drilling.

During the drilling operation, the bush rotates on its seat thereby allowing the bell to remain fixed; to this end, the bush and relevant seat are made of nylon, teflon or other materials with a low friction coefficient. Both bush and seat can also be lubricated from time to time.

This solution is particularly interesting because of its simplicity and its virtually universal interchangeability; if a bell is fitted on the drill frame, the shape and size of the latter will have to be considered and, therefore, a different bell will be needed for each type of drill.

By connecting the bell directly on the drill bit, the bell always remains the same irrespective of the models of drill.

It will be easier to grasp how the invention works by reading the description and taking a look at the enclosed drawing which provides an example of the invention.

BRIEF DESCRIPTION OF THE DRAWINGS

The FIG. shows a side view of the bell fitted on a drill, complete with a system extracting the waste material from the bell and channelling it into the collecting filter-bag.

DETAILED DESCRIPTION OF THE PREFERRED EMBODIMENTS

Figure 1:
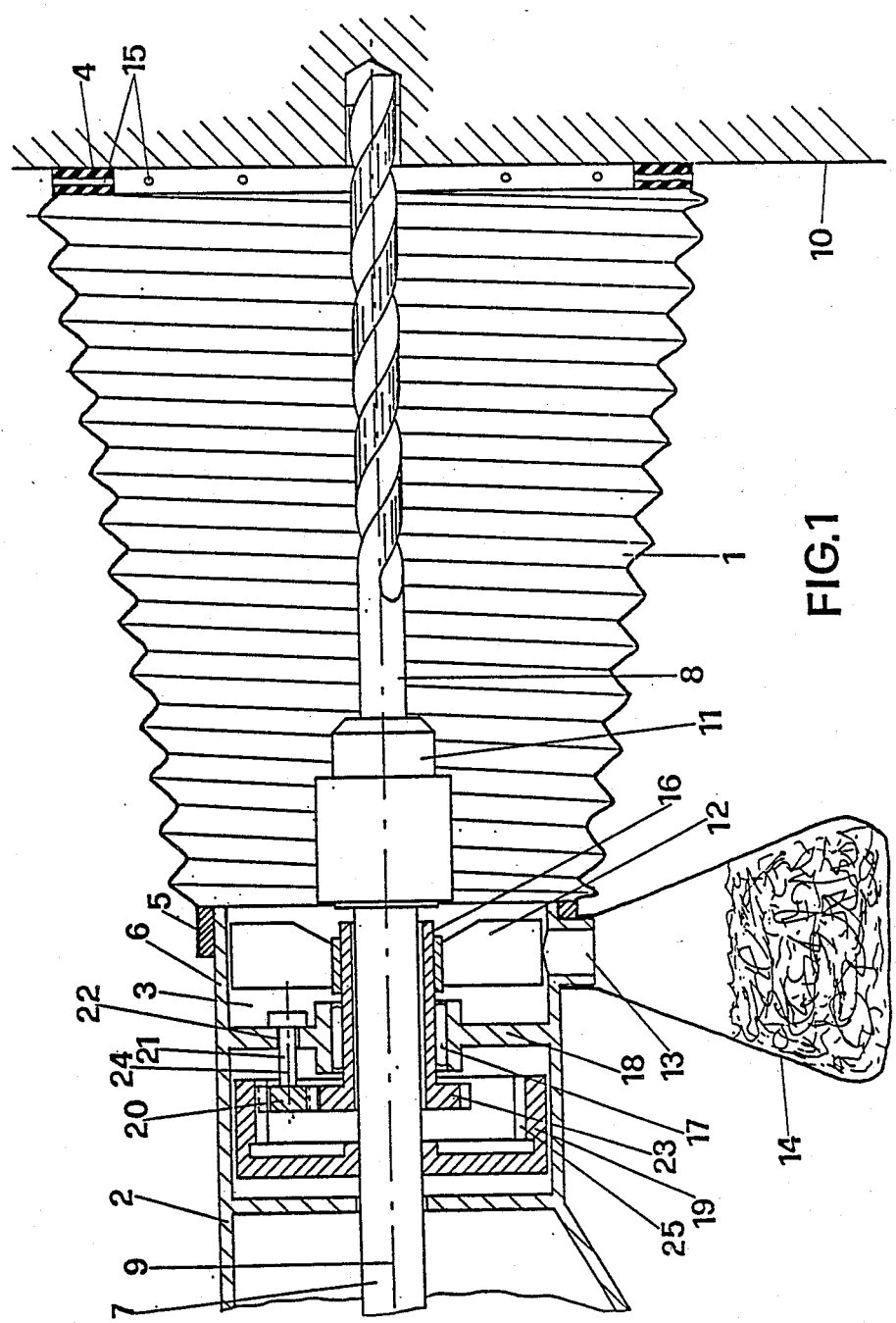

The present invention is composed of a bell 1 fitted onto frame 2 of a drill, so that a circular aspiration chamber 3 can be created.

Bell 1, made of a special material, with suitable features of solidity, strength, durability and flexibility, has a frustum-conical bellows shape and a good axial flexibility which lends it the features of a spring.

The two ends of bell 1 are open. The wider one has a seal ring 4 all around it, while the smaller one is provided with a locking ring 5 by means of which bell 1 can be pressure connected to collar 6 of aspiration chamber 3, i.e. to the drill.

Once bell 1 is fitted on the drill, its position is coaxial to driving shaft 7 of the drill, i.e. to drill bit 8; the latter are both aligned along the same axis of rotation 9.

Seal ring 4 is to be positioned with its base parallel to surface 10 of the material to be drilled and, thanks to its soft and elastic material (neoprene, sponge rubber, etc.) it adjusts to surface 10 even when this is rough and uneven, thereby preventing some waste material to escape because of to possible gaps around the ring.

Once bell 1 is fitted on the drill and drill bit 8 on spindle 11, bell 1 will have to be longer than drill bit 8. so that, once the bit has been placed on surface 10, seal ring 4 can already be in contact with and pressed against surface 10, in such a way that it can adjust and adhere to surface 10 itself. At this stage, the drilling can start; as drill bit 8 advances inside the material, bell 1 is pressed against surface 10 thereby increasing the grip of seal ring 4; meanwhile, the waste material is discharged into the receptacle formed by the shell of bell 1, from surface 10 of the material to be drilled and aspiration chamber 3.

As soon as the drill is put into operation, fan 12 inside aspiration chamber 3 starts rotating, producing, inside bell 1, an air flow axially blowing from surface 10 of the material to be drilled towards the aspiration chamber 3.

This air flow carries with it the waste material produced in the course of drilling, preventing it from accumulating inside the bell and channelling it, through a discharge pipe 13, inside aspiration chamber 3, into filter-bag 14 where the material collects.

A row of holes 15 (or, as an alternative, some slits) around the perimeter and radially positioned along seal ring 4, maintains and controls the air flow produced by fan 12.

This air flow, besides channelling the waste material, carries out the important function of cooling down drill bit 8.

In this way, several holes can be drilled without having to interrupt the work and without the waste material being scattered around and drill bit 8 overheating. The only limit is the capacity of collecting filter-bag 14 which, once filled, must be replaced or emptied, which is however a simple and quick operation.

As already mentioned, fan 12 comes into action as soon as the drill starts operating, because of the connection between fan 12 and driving shaft 7.

Fan 12 inside aspiration chamber 3 is keyed on one end of hollow shaft 16, coaxially fitted on driving shaft 7 of the drill and supported by needle bearing 17; the seat of the latter is on wall 18 enclosing aspiration chamber 3.

Hollow shaft 16 is set into motion by driving shaft 7 by means of gearings guaranteeing a certain degree of ratio between the rotation velocities of the two shafts, with the aim of ensuring the ideal operation velocity to the elements connected to both shafts, i.e. drill bit 8 and aspiration fan 12.

The abovementioned drill is, in turn, made up of an internal gear 19 keyed on driving shaft 7, which meshes in idle wheel 20, keyed on idle spindle 21 which is supported by bearing 22 seated on wall 18. Finally, idle wheel 20 meshes in wheel 23 keyed on one end of hollow shaft 16, fan 12 being fitted on the other end.

Idle spindle 21 can also be shifted along its axis of rotation 24 thereby disconnecting its gears from internal gear 19 and wheel 23; in this way, the motion transmission between driving shaft 10 and fan 12 will be disconnected.

The width of teeth 25 of internal gear 19 is greater than that of other gears.

This is a measure to guarantee the motion transmission between driving shaft 7 and hollow shaft 16 also in drills provided with a percussion mechanism.

In this case, driving shaft 7 alternatively moves along its axis of rotation 9, involving in this movement also internal gear 19; if teeth 25 of the internal gear were not wider than those of idle wheel 20 they would not mesh in the latter and the transmission between the two shafts would come to an end.

What is claimed is:

1. In combination, an antiscattering device for the collection of waste material produced in the course of drilling and milling, and a machine tool onto which said device is to be fitted, comprising:
    means for attaching a drill bit to the tool;
    a frustum-conical bellows bell which is fitted on a frame of the tool coaxially with the means for attaching the drill bit and forming a passage for the waste material;
    a fan coaxial with the means for attaching the drill bit for providing suction;
    a seal ring connected to the wider end of said bell to be placed on a surface of the material to be drilled and having a plurality of holes defined therein for maintaining and controlling air flow produced by the fan;
    collecting means mounted on the frame of the tool for collecting the waste material which passes through said bell;
    a driving shaft for driving rotation of the drill bit;
    a hollow shaft coaxial and surrounding said driving shaft for driving said fan; and
    gear means for directly connecting said hollow shaft of said fan to the driving shaft of the tool, for rotating said fan at an angular velocity different than the angular velocity of the drill bit to ensure substantial ideal operation velocities for said fan and the drill bit, and for causing operation of the fan when said tool is operated;
    wherein the waste material created by the tool is suctioned through said bell by said fan into said collecting means.

2. The antiscattering device for the collection of waste material according to claim 1, wherein said gear means comprises:
    an internal gear keyed on said driving shaft;
    an idle spindle supported by a bearing on an internal wall of the tool;
    an idle wheel keyed on said idle spindle which meshes with said internal gear;
    a wheel keyed on said hollow shaft which meshes with said idle wheel.

3. The antiscattering device for the collection of waste material according to claim 2, wherein teeth provided on said internal gear have a width greater than teeth provided on the other gears of said gear means to assure motion transmission between said driving shaft and said hollow shaft.

4. The antiscattering device for the collection of waste material according to claim 1, wherein said bell has an extended length which is longer than that of the drill bit.

* * * * *